3,001,855
PRODUCTION OF HIGH QUALITY BORON
Joseph C. Schumacher, Los Angeles, and Rodger W. Baier, Whittier, Calif., assignors to American Potash & Chemical Corporation, a corporation of Delaware
No Drawing. Filed Apr. 21, 1958, Ser. No. 729,493
8 Claims. (Cl. 23—209)

This is a continuation-in-part of application Serial No. 621,201, filed November 9, 1956, now abandoned.

This invention relates to the manufacture of elemental boron of relatively high purity.

Boron can be prepared by a number of metallic reductions, as follows:

1.
$$B_2O_3 + 6X \rightarrow 2B + 3X_2O$$
X = an alkali metal—Na, K, Li, Cs, Rb

2.
$$B_2O_3 + 3Y \rightarrow 2B + 3YO$$
Y = an alkaline earth metal—Ca, Mg, Ba, Sr 3.
$$2B_2O_3 + 3Z \rightarrow 4B + 3ZO_2$$
Z = Ti, Zr, Hf 4.
$$B_2O_3 + 2Al \rightarrow 2B + Al_2O_3$$

Any boron halide can be substituted for the boric oxide in the above reactions.

In all cases, the crude boron is contaminated with the metal used for the reduction. The metal contaminate cannot be removed by acid or water leaching. Studies of the crude product indicate that the contaminate is not present as a boron compound such as a boride, but is probably trapped in the boron lattice.

We have found that such a crude boron can be purified readily by treatment at an elevated temperature with a halogen, e.g., chlorine or bromine. For example, a high magnesium-containing boron product is first prepared by reacting powdered magnesium and fine granular boric oxide in a non-oxidizing atmosphere, the resulting mass being thereafter ground and acid leached with a mineral acid. The solids are then filtered, dried in a non-oxidizing atmosphere, preferably that provided by an inert gas such as argon, helium and the like; the drying is continued for a sufficient time to remove any significant quantities of air and moisture. Under these final conditions, the boron is raised to about 700° C. in the presence of a halogen, and is held there for about ten minutes, followed by cooling to room temperature in the absence of air. Care must be taken during the heating that the temperature does not rise much above 700° to avoid formation of boron trichloride, and it is desirable to remove the heat source to compensate for heat generated by the chlorination of the magnesium present. Following the treatment with the halogen, the remaining material is treated to remove the magnesium halide as by an aqueous leach, filtered and dried.

In practicing the magnesium-boric oxide process, it is preferred to use magnesium and boric oxide at a weight ratio of about 1 to 1.3. We have found that relatively poor boron efficiency is obtained at a 1 to 1.5 ratio, while at a 1 to 1 ratio, the reaction is quite violent. The particle size of the materials subjected to the magnesiothermic reaction is not critical. For example, the boric oxide particle size can vary between −20 mesh to −60 mesh, without affecting the composition of the high magnesium containing boron product. Magnesium particles of between −50 to +100 mesh are satisfactory. To provide the non-oxidizing atmosphere, one can use any inert gas or ammonia can be used with a flotation step to remove any boron nitrides produced during the reduction step. In the acid leach step, hydrogen chloride is preferably used as the mineral acid, the quantity added being such that preferably a 30% to a 50% excess of hydrogen chloride is provided with respect to that required to form magnesium chloride with all of the magnesium present. The temperature during letch is maintained relatively elevated—about 100° C., preferably, for about two hours. The hydrogen chloride need not be of great strength, and from a 1% to a 10% solution suffices.

The invention is not limited to removal of magnesium from boron contaminated with magnesium, since one can produce a boron containing 85% boron by electrolysis of a sodium oxide-boric oxide mixture, to produce a boron containing 85% boron and approximately 11%–15% sodium and very little oxygen. In place of sodium oxide, one can use the oxide of any other alkali metal, e.g., potassium or lithium.

It is desirable that the material passed to the magnesium halide formation step should have an oxygen content below about 1%; further, oxygen must be excluded from the atmosphere before the halogenation, during heating and while cooling. It is desirable that the halogenation of the residual magnesium take place at about 700° and for about ten minutes.

The practice of the invention will become further apparent from the following, which is set forth by way of illustration and not by way of limitation.

*Example 1.* Two thousand thirty-six grams of −50 +100 mesh magnesium was mixed with 3164 grams of −20 mesh boron oxide, a ratio of 1 to 1.2; 5453 grams were used to fill a 28-gauge steel tray 3″x12″x12″. The tray was placed in a water cooled canopy which could be flushed with argon. As soon as the reaction was initiated, using an oxy-acetylene torch on the container wall, the canopy was lowered in place and swept with argon. Quite a violent reaction ensued lasting about twenty minutes and approximately 600 grams of reactants was thrown out of the tray. After a four-hour cooling period, the porous mass was passed through a jaw crusher and a pulverizer until the entire mass could pass through a 50 mesh screen. Six hundred nineteen grams of this powder was boiled under reflux for three hours in 7.2 liters of a 13.7 percent hydrogen chloride solution. Material obtained by filtering, water and acetone washing and drying the residue from this leach weighted 83.1 grams and had the following analysis:

| | Percent |
|---|---|
| Net boron | 86.7 |
| Water soluble boron | 0.0 |
| Magnesium | 12.1 |
| Difference | 1.2 |
| | 100.00 |

Five grams of this high magnesium-containing boron was then placed in a 1″ Vycor combustion tube and centered in a combustion furnace. Argon was passed through the tube for 20 minutes at a rate of one-fifth of a liter per minute while the boron was heated to 650° C. At this temperature, chlorine was passed through the tube for five minutes, the heat source was removed, and argon replaced the chlorine sweep until the boron reached room temperature. The sample then weighed 6.54 grams. It was boiled for one hour in 400 ml. of 10% hydrochloric acid, filtered, water and acetone washed and dried at 60° C. in a vacuum oven. The residue weighed 4.35 grams, representing a 98.2% efficiency based on boron, and contained 97.9% boron.

*Examples 2–8.*—To illustrate the removal of an alkali metal from boron, chlorine was passed at 100–150 cc./minute over a crude boron resulting from the electrolysis of a sodium oxide-boric oxide mixture. This product had the following composition:

| | Weight percent |
|---|---|
| B | 86.50 |
| Na | 11.00 |
| Fe | 0.19 |
| HNO₃ ins. | 0.37 |

The crude boron was placed in an open carbon or nickel container which was then placed in a quartz tube. The boron was heated in an argon atmosphere to 700°–900° C. and the chlorine then admitted for a given time period. The boron was then cooled under argon and, finally, acid and water leached. Details of the operation and analysis of the product are given in the following table:

| Example | Temp. (°C.) | Time of Chlorination (hrs.) | Chemical Analysis (Weight percent) | | | |
|---|---|---|---|---|---|---|
| | | | B | Na | HNO₃ Insol. | Fe |
| 2 | 750–770 | 0.25 | 95.9 | 0.80 | 1.69 | 0.10 |
| 3 | 750–770 | 0.25 | 96.4 | 0.67 | 0.40 | 0.11 |
| 4 | 747–759 | 0.5 | 95.6 | 0.68 | 2.19 | 0.18 |
| 5 | 747–759 | 0.5 | 97.1 | 0.39 | 0.30 | 0.26 |
| 6 | 900 | 0.5 | 96.69 | 0.67 | 0.90 | 0.31 |
| 7 | 900 | 0.5 | 96.83 | 0.68 | 0.92 | 0.46 |
| 8 | 820–835 | 0.5 | 95.79 | 0.63 | 1.64 | 0.27 |

The sodium present in the crude product could not be removed by acid or water leaching prior to the halogenation whereas afterwards it was readily removed as sodium chloride. The halogen reacts preferentially with the metal contaminate, the boron trihalide not being formed until the metal contaminate has been halogenated.

In a similar manner, one can reduce boric oxide or any of the boron halides with an alkali metal, an alkaline earth metal titanium, zirconium, hafnium or aluminum, as has been indicated in reactions 1–4 above. In each case, the halide formed is removed, either as a volatile halide or else by leaching as with water and an acid.

We claim:

1. A process for refining crude boron containing as an impurity a metal selected from the class consisting of alkali metals, alkaline earth metals, magnesium, aluminum, titanium, zirconium, and hafnium comprising: heating the said crude boron to a temperature of between about 650° C. and 900° C. in a dry, non-oxidizing atmosphere, passing a gaseous halogen selected from the class consisting of chlorine and bromine over the said crude boron for a time sufficient to allow substantially all of the said metal impurity to react with the said halogen; cooling the boron and the metal halide so formed; and thereafter leaching the said metal halide from the said boron with 1–10% boiling HCl.

2. In a process for refining boron containing a metal as an impurity selected from the class consisting of alkali metals, alkaline earth metals, titanium, zirconium, hafnium, aluminum and magnesium, the steps of heating the said boron containing the said impurity to a temperature of between about 650° C. and 900° C., contacting the said impurity with a gaseous halogen selected from the class consisting of chlorine and bromine to form the halide of the said metal impurity and removing the so-formed metal halide from the boron.

3. In a process for refining boron containing an alkali metal impurity, the steps of heating the said boron containing the said alkali metal impurity to a temperature of between about 650° C. and 900° C., contacting the said impurity with a gaseous halogen selected from the class consisting of chlorine and bromine to form the halide of the said alkali metal impurity and removing the so-formed metal halide from the boron.

4. In a process for refining boron containing an alkali metal as an impurity, the steps of heating the said boron and alkali metal to between about 650° C. and 900° C., contacting the said alkali metal with gaseous chlorine to form the chloride of the alkali metal and removing the so-formed alkali metal chloride.

5. In a process for refining boron containing sodium metal as an impurity, the steps of heating the said boron containing the said sodium metal to between about 650° C. and 900° C., contacting the said sodium impurity with gaseous chlorine to form sodium chloride and removing the so-formed sodium chloride from the said boron.

6. In a process for refining boron containing an alkaline earth metal impurity, the steps of heating the said boron and the said alkaline earth metal impurity to between about 650° C. and 900° C., contacting the said alkaline earth metal impurity with gaseous chlorine to form the alkaline earth metal chloride, and removing the so-formed alkaline earth metal chloride.

7. In a process for refining boron containing a magnesium impurity, the steps of heating the said boron and the said magnesium impurity to a temperature of between about 650° C. and 900° C., contacting the said magnesium impurity with gaseous chlorine to form magnesium chloride, and removing the so-formed magnesium chloride.

8. In a process for refining boron containing aluminum as an impurity, the steps of heating the said boron containing said aluminum to a temperature of between about 650° C. and 900° C., contacting the said aluminum impurity with gaseous chlorine to form aluminum chloride, and removing the so-formed aluminum chloride.

References Cited in the file of this patent

UNITED STATES PATENTS

| 997,879 | Weintraub | July 11, 1911 |
| 1,231,471 | Ashcroft | June 26, 1917 |
| 2,384,479 | Lepsoe et al. | Sept. 11, 1945 |
| 2,893,842 | Kroll et al. | July 7, 1959 |

OTHER REFERENCES

Mellor: "Comprehensive Treatise on Inorganic and Theoretical Chemistry," vol. 4, page 787, lines 1 to 6.

"Chemical Abstracts," vol. 50, 1956, cols. 7692–3.

J. H. Hildebrand: "Principles of Chemistry," The Macmillan Co., N.Y., 1947, 5th ed., page 161 (part II, page headed "Group VII The Halogens").